US 6,654,388 B1

(12) United States Patent
Lexenberg et al.

(10) Patent No.: US 6,654,388 B1
(45) Date of Patent: Nov. 25, 2003

(54) METHOD AND APPARATUS FOR AUTOMATICALLY DETERMINING ALLOCATION OF VOICE AND DATA CHANNELS ON T1/E1 LINE

(75) Inventors: Robert A. Lexenberg, Woodside, CA (US); Yifei C. Huang, Redwood City, CA (US)

(73) Assignee: Larscom Incorporated, Milpitas, CA (US)

( * ) Notice: Subject to any disclaimer, the term of this patent is extended or adjusted under 35 U.S.C. 154(b) by 0 days.

(21) Appl. No.: 09/320,388

(22) Filed: May 26, 1999

(51) Int. Cl.[7] ................................................. H04J 3/00
(52) U.S. Cl. ...................... 370/498; 370/352; 370/353; 370/437; 370/493
(58) Field of Search ................................. 370/352, 353, 370/354, 355, 356, 358, 360, 401, 419, 420, 437, 442, 450, 454, 456, 458, 459, 463, 468, 465, 487, 490, 493, 494, 495, 496, 498, 526, 532, 535, 536, 537, 538; 379/93.01, 93.09, 100.06, 203, 219, 93.05

(56) References Cited

U.S. PATENT DOCUMENTS

| | | | | | |
|---|---|---|---|---|---|
| 5,557,608 | A | * | 9/1996 | Calvignac et al. | 370/389 |
| 5,949,763 | A | * | 9/1999 | Lund | 370/261 |
| 6,205,208 | B1 | * | 3/2001 | Detlefsen et al. | 379/93.05 |
| 6,256,325 | B1 | * | 7/2001 | Park | 370/503 |
| 6,421,356 | B2 | * | 7/2002 | Carter et al. | 370/468 |

* cited by examiner

*Primary Examiner*—Douglas Olms
*Assistant Examiner*—Phirin Sam
(74) *Attorney, Agent, or Firm*—Blakely, Sokoloff, Taylor & Zafman, LLP (57) ABSTRACT

A device for combining voice and data into a single T1 line performs the functions of a channel bank, IP gateway, multiplexer, and firewall. The device includes automatic configuration capability which allows the device to be automatically and remotely provisioned, including automatically determining the allocation of voice and data DS0s. Automatic configuration allows installation of the device at a user site by non-data-centric technicians and without the need for pre-installation staging to configure the device.

26 Claims, 6 Drawing Sheets

METHOD AND APPARATUS FOR AUTOMATICALLY DETERMINING ALLOCATION OF VOICE AND DATA CHANNELS ON T1/E1 LINE

FIELD OF THE INVENTION

The present invention pertains to systems for transmitting voice and data over a T1 line or E1 line. More particularly, the present invention relates to a technique for automatically determining and provisioning the allocation of voice and data channels, or "DS0s", on a T1 line or E1 Line.

BACKGROUND OF THE INVENTION

T1 is a technology which allows the transmission of high-speed digital data on a network. T1 lines are a popular leased line option for businesses connecting to the Internet and for Internet Service Providers (ISPs) connecting to the Internet backbone. The standard T1 data rate is 1.544 Mbps. T1 lines are capable of carrying both voice data and non-voice data. Commonly, a T1 line is used to connect Customer Premises Equipment (CPE) to a network carrier Central Office (CO), which in turn has a connection to a Public Switched Telephone Network (PSTN), the Internet, or both.

CPE products are available which are capable of integrating voice data and non-voice data for transmission onto a single T1 line. One such device is the T1 Integrator™, available from VINA Technologies of Fremont, Calif. One problem with some such CPE products is that they must be preconfigured in a staging area prior to deployment at a customer site. This configuration process includes configuring the device for the proper allocation of T1 channels, referred to as "DS0s", between voice and data. This configuration process can be difficult, time-consuming, and inconvenient.

SUMMARY OF THE INVENTION

An apparatus for transmitting integrated voice data and non-voice data over a T1 line on a network includes a voice input interface, a network interface, a processing unit, and a T1 interface. The voice input interface is configured to input the voice data, and the network interface is configured to input the non-voice data. The processing unit is configured to automatically identify the allocation of time slots of the T1 line between voice data and non-voice data. The T1 interface is configured to time-division multiplex the voice data and the non-voice data and to transmit the time-division multiplexed voice data and non-voice data onto the T1 line according to the identified allocation of the time slots.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for combining voice and data into a single T1 line and having automatic configuration capability are described. As described in greater detail below, a device referred to herein as the "integrator" performs the functions of a channel bank, Internet Protocol (IP) gateway, multiplexer, and firewall. The integrator includes automatic configuration capability which allows it to be automatically and remotely provisioned from a carrier CO. The automatic configuration capability includes the ability to automatically identify the allocation of channels between voice and data. This technique has an advantage over other methods used to provision similar CPE devices in that it allows installation at customer premises by non-data-centric technicians; no pre-installation staging is required to configure the device.

It should be noted that, although the integrator is described for use with a T1 line, it is also equally applicable to use with the European equivalent of T1, known as E1. Therefore, unless stated otherwise, references herein to "T1" should be interpreted to mean T1 or E1 ("T1/E1") or fractional T1/E1, i.e., some amount of DS0s of a T1/E1 line.

Figure 1:
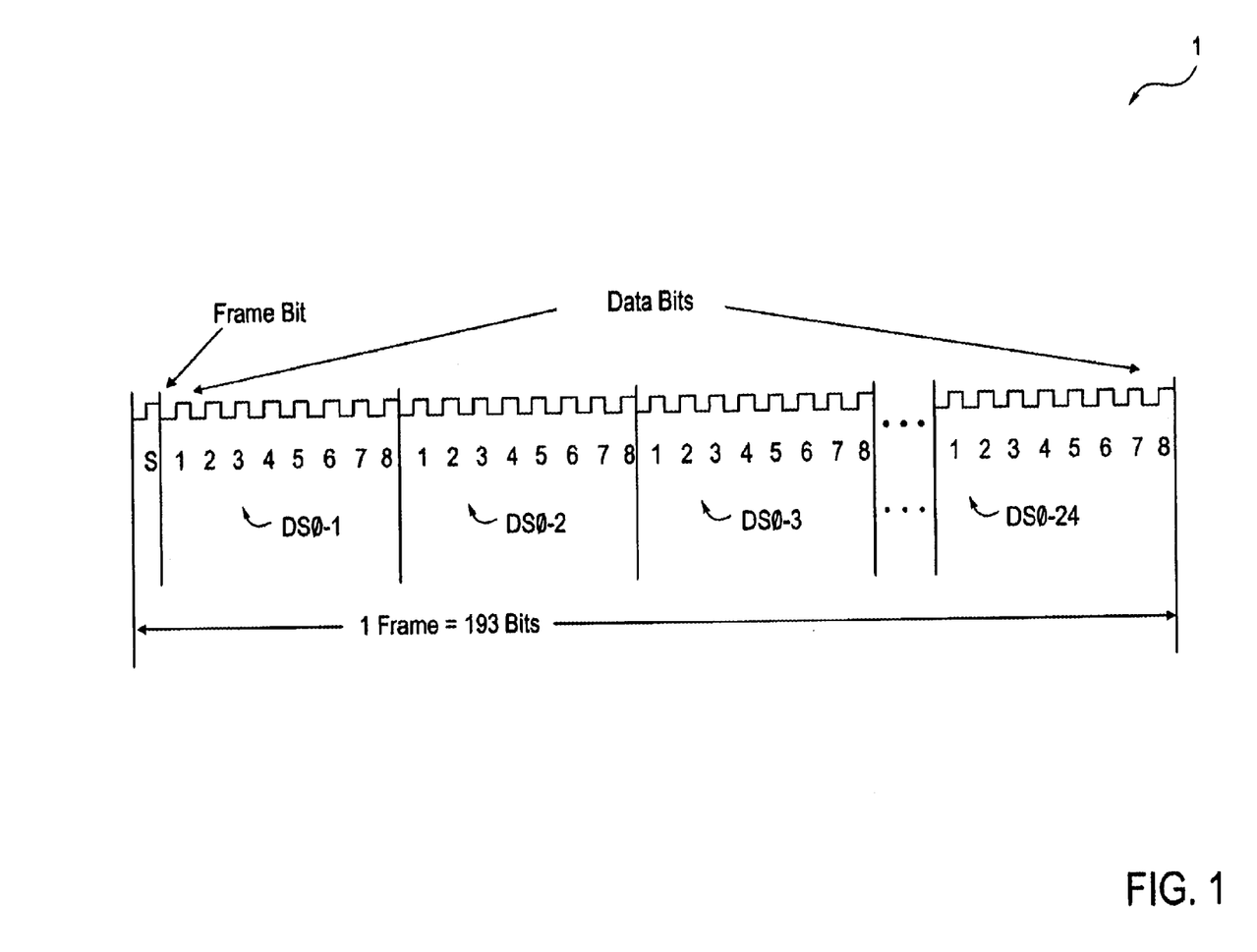
FIG. 1 illustrates a T1 frame.

Refer now to FIG. 1, which illustrates a standard T1 frame 1. A T1 line has a Data transfer rate of 1.544 Mbps and consists of 24 individual "channels", each of which supports a transfer rate of 64 Kbps. Each frame therefore includes 24 separate 8-bit time slots, known as "DS0s" (here, DS0s, DS0-1 through DS0-24), one for each of the 24 channels. In addition, the time slot for the first DS0, DS0-1, is preceded by a frame bit, which is used for synchronization and to indicate the start of the frame 1. Hence, each T1 frame consists of 193 bits.

Each DS0 can be used to carry either voice data (hereinafter simply "voice"), such as used for telephony, or non-voice data (hereinafter simply "data"), such as used for computer-to-computer communications. Accordingly, the above-mentioned integrator can be used to time-division multiplex both voice and data, such that certain DS0s in each frame carry voice and other DS0s in each frame carry data. This capability can be used to allow a single T1 line to be used to support both computer systems and telephone extensions at customer premises.

Figure 2:
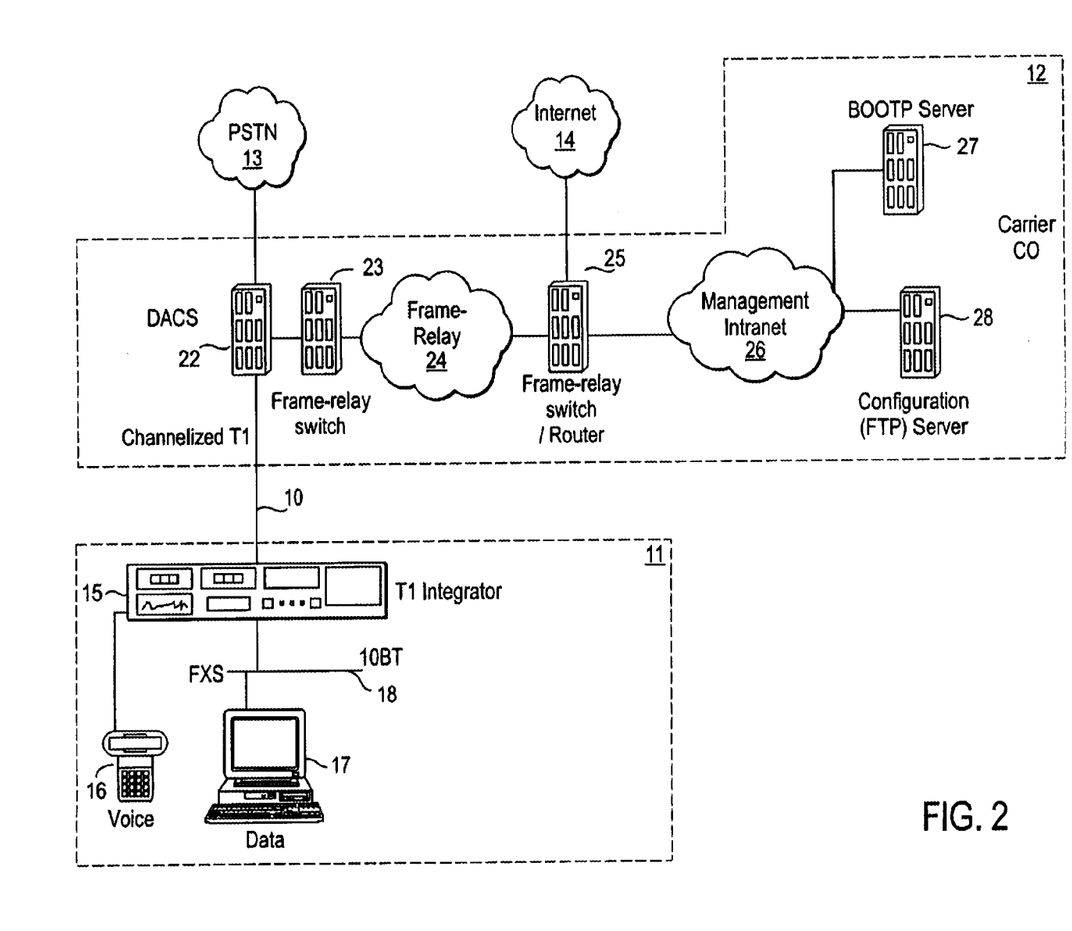
FIG. 2 illustrates a network configuration in which a T1 line is used to connect Customer Premises Equipment (CPE) with a network carrier Central Office (CO).

FIG. 2 illustrates an example of a network configuration in which the integrator can be used. As shown, customer premises 11 are connected by the T1 line to a local carrier central office (CO) 12. In this example, the carrier CO 12 has a direct connection to a Public Switched Telephone Network (PSTN) 13 and the Internet 14. The CPE at the customer premises 11 includes the integrator 15, which is connected directly to the T1 line 10. One or more computer systems 17 are coupled to the integrator 15 on a Local Area Network (LAN) 18, which may be a 10BaseT type network. In addition, one or more telephone extensions 16 are connected to the integrator 15. The integrator 15 "integrates" both data received from the computer systems 17 over the LAN 18 and voice from the telephone extensions 16 and transmits the integrated data to the carrier CO 12 over the T1 line 10 using time-division multiplexing. In addition, in at least one embodiment, the integrator 15 also performs the functions of a channel bank, Internet Protocol (IP) gateway, multiplexer, and firewall.

The carrier CO 12 includes the following equipment: a Digital Access Cross-Connect (DACS) 22, a frame relay switch 23, a frame relay network 24, a frame relay switch/router 25, a management intranet 26, a BOOTP server 27, and a configuration server 28. The DACS 22 is coupled to the T1 line 10, the PSTN 13, and the frame relay switch 23. Frame relay switch 23 is coupled through the frame relay network 24 to the switch/router 25, which is connected to the Internet 14. The switch/router 25 is coupled through the management intranet 26 to the configuration server 28 and the BOOTP server 27. The BOOTP server 27 and the configuration server 28 each may be implemented in a conventional computer system, such as a personal computer (PC), workstation, etc; the functions of these devices are described further below. The functions and construction of the other components of the carrier CO 12 are well-known and need not be described herein.

Figure 3:
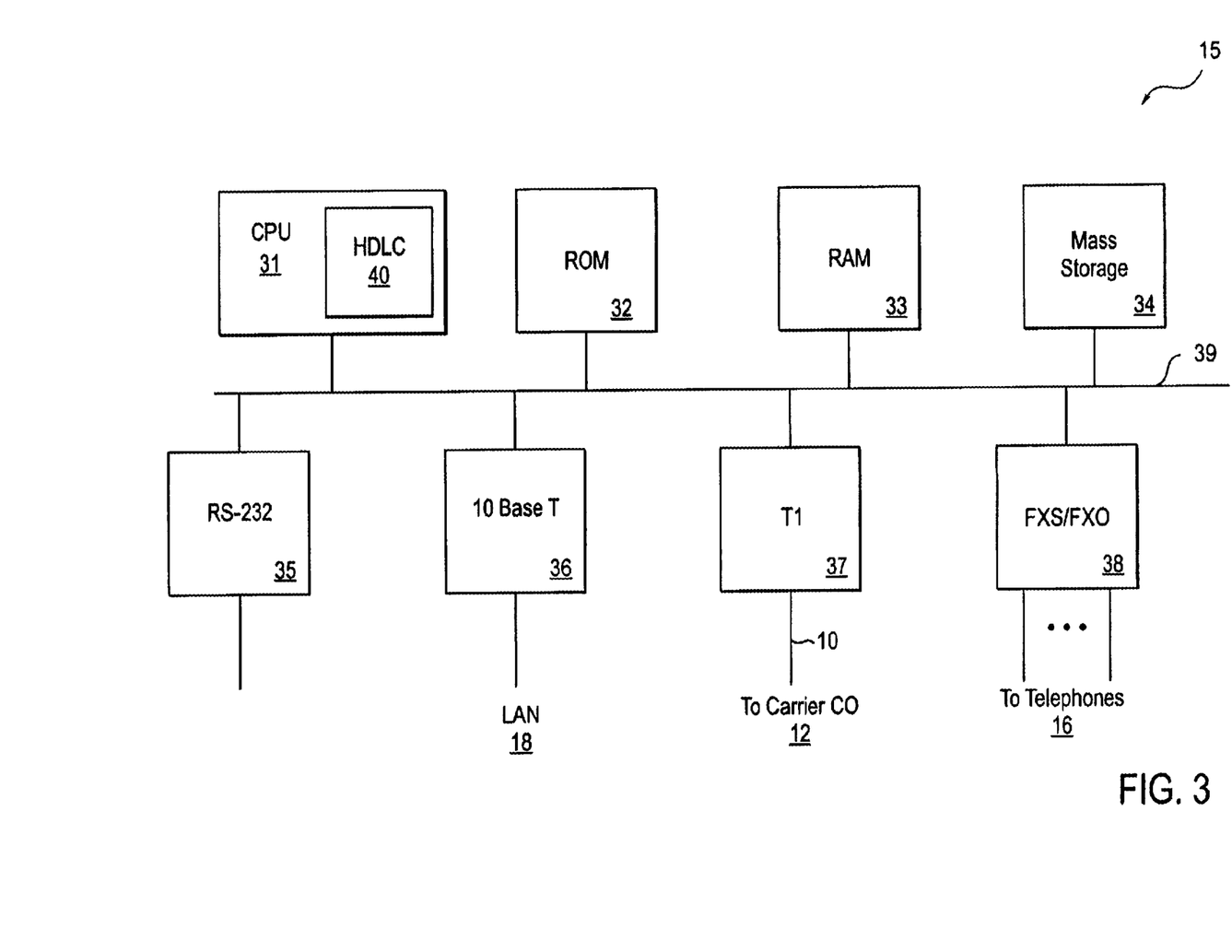
FIG. 3 illustrates an example of the hardware configuration of the integrator.

FIG. 3 illustrates the hardware configuration of the integrator 15, according to a least one embodiment. Note that FIG. 3 is a highly schematized representation and is not intended to represent any one particular architecture. That is, the precise architectural configuration of the integrator 15 is unimportant for purposes of understanding and practicing present invention. Thus, the illustrated integrator 15 includes a central processing unit (CPU) 31, read-only memory (ROM) 32, random access memory (33), and a mass storage device 34, each coupled to a bus system 39. Bus system 39 may include one or more distinct buses, which may be connected to each other through various bridges, controllers, and/or adapters. The CPU 31, which controls the overall operation of the integrator 15, includes a High-level Data Link (HDLC) controller 40. The CPU 31 may be, or may include, one or more programmable general-purpose or special-purpose microprocessors, Application-Specific Integrated Circuits (ASICs), Programmable Logic Devices (PLDs), Field Programmable Gate Arrays (FPGAs), or other suitable integrated circuit or similar like devices. The mass storage device 34, which is optional, may include any device suitable for storing large volumes of data in a non-volatile manner, such as on a magnetic or optical disk or tape (e.g., CD-x, DVD, etc.).

Also coupled to the bus system 39 are an RS-232 interface 35, a LAN adapter 36, a T1 interface 37, and a telephony interface 38. The purpose of the RS-232 interface 35 is to allow manual configuration and/or diagnostics of the Integrator 15, which may be accomplished, for example, through a user interface on a connected "dumb" terminal. The LAN adapter 36 may be a conventional Ethernet adapter, for example. The T1 interface 37 is for coupling the integrator to the T1 line 10 and includes a transceiver for transmitting and receiving voice and data for the T1 line 10. The telephony interface 38 includes a Foreign exchange Service/Foreign exchange Office (FXS/FXO) facility and provides the integrator 15 with a connection to one or more telephone extensions via standard telephone lines.

Note that many variations upon the configuration of FIG. 3 are possible within the scope of the present invention. For example, certain embodiments may include additional components not illustrated in FIG. 3, whereas other embodiments may omit certain components shown in FIG. 3. As an example, of the latter case, certain embodiments of the Integrator 15 may not include a mass storage device.

Figure 4:
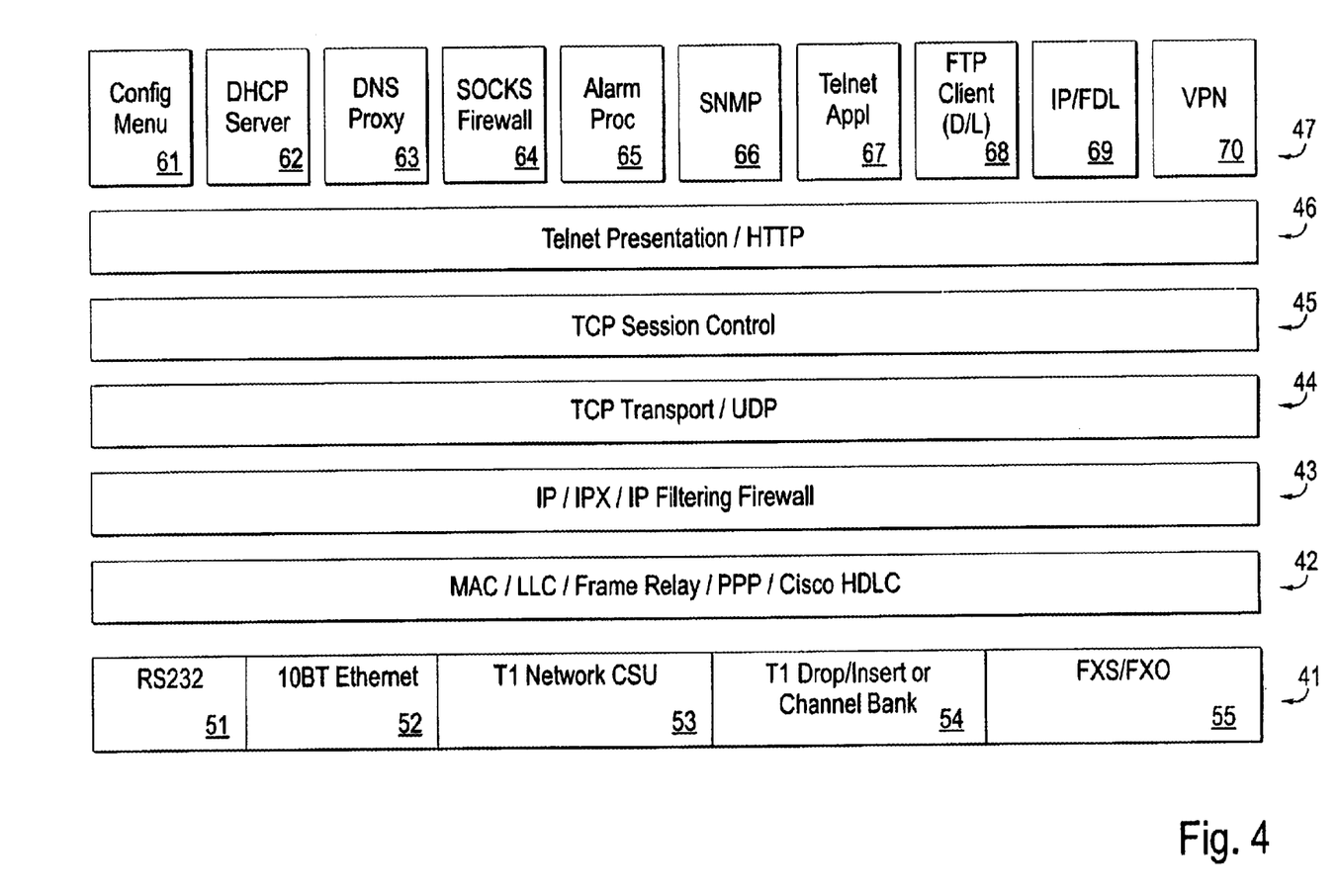
FIG. 4 illustrates an example of the software configuration of the integrator.

FIG. 4 illustrates the software of the integrator 15, according to a least one embodiment. The software of the integrator 15 may be stored in, for example, ROM 32, RAM 33, mass storage device 34, or a combination of these devices. As shown, the software is organized into seven layers: a physical layer 41, a data link layer 42, a network layer 43, a transport layer 44, a session layer 45, a presentation layer 46, and an application layer 47. The physical layer 41 includes various facilities for operating the hardware components shown in FIG. 3, including an RS-232 driver 51, an Ethernet driver 52, a T1 network channel service unit (CSU) 53, a T1 drop/insert or channel bank facility 54, and an FXS/FXO facility 55. The data link layer 42 includes an Ethernet media access control (MAC) facility, Logical Link Control (LLC), frame relay, Point-to-Point Protocol (PPP), and HDLC functions. The network layer 43 includes facilities for controlling IP and IPX functions as well as an IP filtering firewall. In the illustrated embodiment, the application layer 47 includes: a configuration menu component 61; a Dynamic Host Configuration Protocol (DHCP) server 62; a Domain Naming System (DNS) proxy 63; a Socket Secure (SOCKS) firewall 64; an alarm component 65; a Simple Network Management Protocol (SNMP) facility 66; a Telnet application 67; and a File Transfer Protocol (FTP) client 68; an IP/FDL facility 69; and a Virtual Private Network (VPN) facility 70.

As noted above, the integrator 15 includes the capability to automatically configure itself, thus eliminating the need for a staging process. The automatic configuration process will now be described with reference to FIGS. 5 and 6. Note that some or all of the automatic configuration functions described below may be implemented at least partially in software. Thus, such functions may be carried out in response to the CPU 31 executing sequences of instructions contained in memory (e.g., ROM 32, RAM 33, mass storage device 34, etc.). In at least one embodiment, it is the T1 Network CSU 53 (FIG. 4) which includes the instructions for carrying out at least some of the automatic configuration functions, as will be apparent from the following description. In other embodiments, hardwired circuitry (within CPU 31 or elsewhere) may be used in place of, or in combination with, software instructions to implement the described functions. Thus, the present invention is not limited to any specific combination of hardware circuitry and software.

Figure 5:
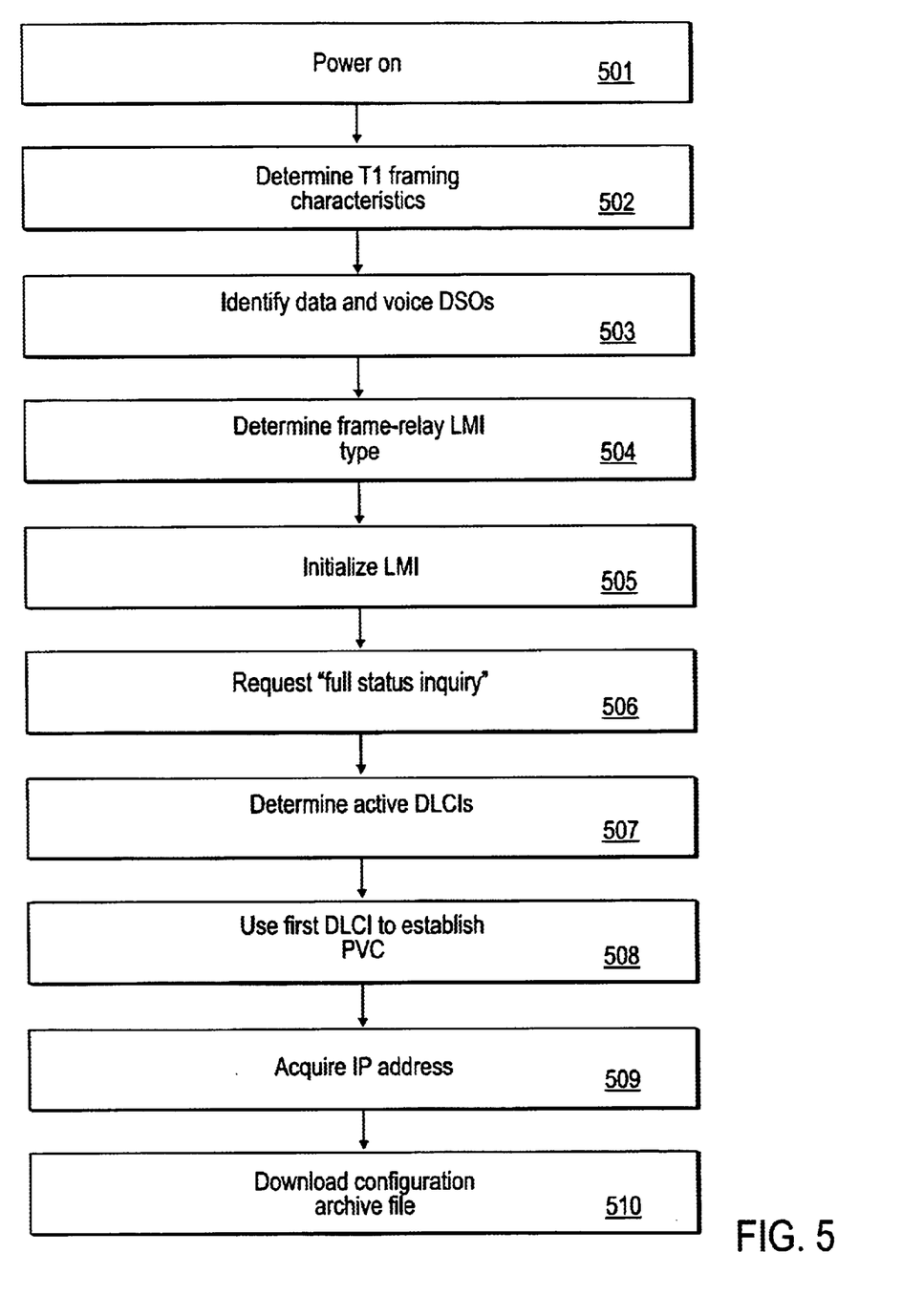
FIG. 5 is a flow diagram illustrating a procedure for automatically configuring the integrator.

The following procedures are based on two assumptions. First, the equipment in the carrier CO 12 carries data frames encapsulated in HDLC frames. Second, the equipment in the carrier CO 12 employs conventional B8ZS coding on the T1 line. Refer now to FIG. 5, which shows a procedure for automatically configuring the integrator 15. Initially, an installer physically mounts the integrator and connects it to power. In response to the power being applied at step 501, the automatic configuration process initiates with the integrator 15 determining at step 502 the type of T1 framing format (e.g., D4, ESF, etc.) that is being used. Specifically, the framing circuitry in the integrator 15 is configured to report a "frame loss" error if the currently set framing type in the integrator 15 is different from the framing type of the CO 12. Hence, by cycling through the various framing types which it supports, the integrator 15 can observe be status of the frame lost error to determine the framing tight on the T1 line. Next, at step 503 the integrator 15 identifies which of the DS0s have been allocated for voice and which of the DS0s have been allocated for data. It is assumed that the allocation of DS0s has been previously determined by the carrier CO 12 or some other entity.

Figure 6:
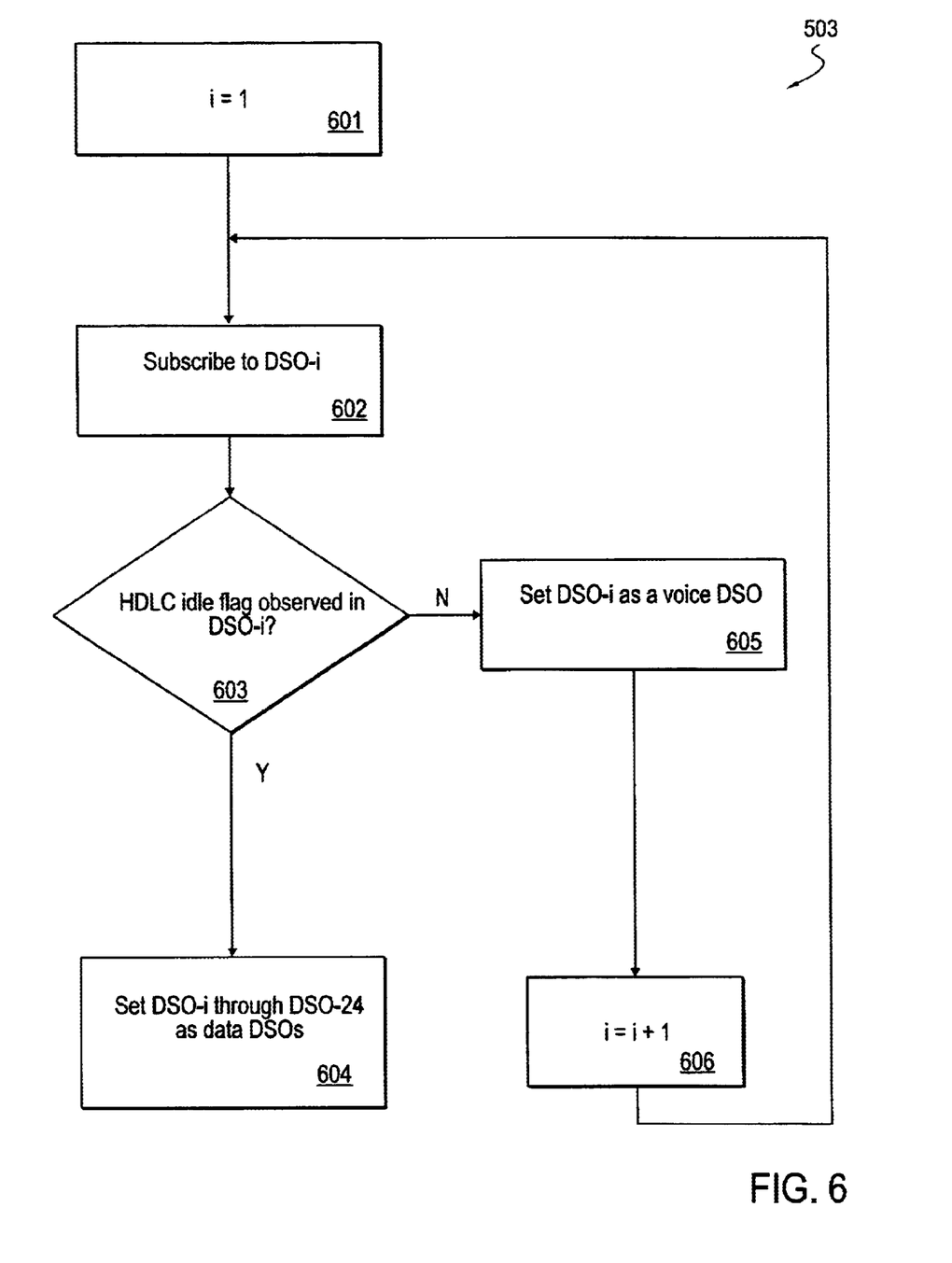
FIG. 6 is a flow diagram illustrating a procedure for automatically identifying the allocation of DS0s between voice and data.

FIG. 6 illustrates step 503 in greater detail, according to a least one embodiment. In at least one embodiment, it is the T1 Network CSU 53 (FIG. 4) which includes the instructions for carrying out the process of step 503. It is assumed that data DS0s are contiguously packed into the upper time slots of each frame, i.e., from DS0-24 down. Using this assumption, the integrator 15 determines which DS0s are provisioned for data by observing HDLC framing, and more specifically, by observing the presence or absence of an HDLC idle flag in the DS0s. Thus, referring to FIG. 6, at 601, an index value i is set to 1, and at 602, the integrator 15 subscribes to DS0-i (initially, DS0-1). At 603, the integrator 15 determines whether an HDLC idle flag is present in DS0-i. If so, the integrator 15 determines that DS0-i through DS0-24 are each provisioned for data, rather than voice. If an HDLC idle flag is not detected in DS0-i, then at 605, DS0-i is determined to be provisioned for voice. Following 605, the index value i is incremented by one, and the procedure repeats from 602, until the allocation of all 24 DS0s has been identified (voice or data). Note that numerous variations of this routine are possible. For example, rather than assuming that all higher DS0s are provisioned for data after the HDLC idle flag is detected for a given DS0, the integrator 15 may instead examine every DS0 to confirm the presence or absence of the HDLC idle flag. Similarly, examination of the DS0s may alternatively is proceed from the highest DS0 (DS0-24) downward.

Referring again to FIG. 5, after the allocation of DS0s is identified, at step 504 the integrator 15 determines the type of frame relay Link Management Interface (LMI) that is being used by the frame relay switch 23 (see FIG. 2). Once the LMI type has been determined, the integrator 15 initializes the LMI of that type at step 505. At step 506, the integrator 15 requests "full status inquiry" from the frame relay switch in order to determine the Data Link Connection Identifiers (DLCIs) that are active on the link at step 507. The first DLCI is used to establish a permanent virtual circuit (PVC) at step 508. It is assumed that the PVC has been previously configured by the carrier CO 12 for a path between the integrator 15 and an IP router.

Next, at step 509 the integrator 15 acquires an IP address. Acquisition of the IP address includes the integrator 15 broadcasting a BOOTP request toward the IP network. In at least one embodiment, the router 25 has the ability to send a response from the BOOTP server 27 back down the PVC to the integrator 15 (since the integrator 15 does not yet have an IP address). Note, however, that certain routers may not have such ability, i.e., the ability to forward a BOOTP response back to the integrator 15 if the integrator 15 does not yet have an IP address. For those embodiments, the following guidelines may be used. First, the router 25 is configured to use frame relay interfaces. Second, individual map statements are created to associate the DLCIs of the PVCs connected to the integrator 15 with IP addresses; these map statements are maintained in the router 25. Third, the router 25 is also configured to operate as a BOOTP server. That is, the router 25 will respond to BOOTP requests on a particular DLCI with the IP address from the associated map statement.

Once the integrator 15 has acquired an IP address, at step 510 the integrator 15 downloads (using FTP) a configuration archive file from the CO 12, and more specifically, from the configuration server 28. The configuration file contains various information for further configuring the integrator 15, such as CPE telephone extension numbers, telephone line settings (e.g., signaling protocols), how local DNS is configured, how frame relay circuits are connected, firewall settings, etc. Assuming other integrators 15 are operated concurrently at other customer premises, the configuration server 28 maintains a unique configuration archive file for each such integrator 15. Once the configuration file has been downloaded, the integrator 15 further configures itself according to the downloaded information. Optionally, the integrator 15 sends an SNMP trap to the CO 12, informing the CO 12 that the automatic configuration process has been completed.

Note that the steps of FIGS. 5 in 6 are performed automatically (i.e., without any human intervention) after power is applied. Optionally, however, the integrator 15 may be designed so that the automatic configuration process stops after a certain point, such as after acquiring the IP address.

It is assumed that there is a "coordinating organization" which gathers information about the installation, including DS0 allocation, frame relay PVCs (DLCIs), IP addresses, trunk types, PBX set-up, firewall, etc. The coordinating organization further arranges for the provisioning/configuration of Data Collection System (DCS), frame relay, and IP routers. In addition, the coordinating organization creates the configuration archive file. The configuration archive file may be created using a configuration user interface provided on a World Wide Web site. Such a user interface will allow a user to enter configuration parameters for an integrator 15, which are saved in the configuration file on a mass storage device. This interface may be provided, for example, by a specially configured integrator 15 connected to the Internet specifically for this purpose. As an alternative example, the user interface may be provided by a conventional personal computer (PC) or workstation.

Thus, a method and apparatus capable of combining voice and data into a single T1 line and having automatic configuration capability have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. An apparatus for transmitting integrated voice data and non-voice data over a T1/E1 line on a network, the T1/E1 line having a plurality of time slots, the apparatus comprising:

an voice input interface configured to input the voice data;

a network interface configured to input the non-voice data;

a processing unit configured to respond to activation of the apparatus by automatically configuring the apparatus for operation, wherein said automatically configuring the apparatus for operation includes automatically identifying an allocation of the time slots between voice data and non-voice data; and a T1/E1 interface configured to be connected to the T1/E1 line, the T1/E1 interface further configured to time-division multiplex the voice data and the non-voice data and to transmit the time-division multiplexed voice data and non-voice data onto the T1/E1 line in accordance with the identified allocation of the time slots.

2. An apparatus as recited in claim 1, wherein the allocation of time slots has been defined at a remote site prior to the processing unit automatically identifying said allocation.

3. An apparatus as recited in claim 1, wherein the processing unit is configured to automatically identify the allocation of the time slots between voice data and non-voice data by identifying one or more occurrences of a predetermined flag in the plurality of time slots.

4. An apparatus as recited in claim 3, wherein the predetermined flag is an HDLC idle flag transmitted onto the T1/E1 line from a remote source on the network.

5. An apparatus for transmitting voice data and non-voice data over a T1/E1 line, the T1/E1 line having a plurality of channels, each channel corresponding to a different one of a plurality of DS0s in each of a plurality of frames, the apparatus comprising:
   first input means for inputting the voice data;
   second input means for inputting the non-voice data;
   configuring means for automatically configuring the apparatus for operation in response to activation of the apparatus, wherein said configuring means includes identifying means for identifying an allocation of the DS0s between voice data and non-voice data;
   integration means for integrating the voice data and the non-voice data input using the first input means and the second input means, respectively; and
   transmission means for transmitting the integrated voice data and non-voice data onto the T1/E1 line in accordance with the identified allocation of the DS0s.

6. An apparatus as recited in claim 5, wherein the identifying means comprises means for identifying the allocation of the DS0s between voice data and non-voice data based on a framing characteristic of the frames.

7. An apparatus as recited in claim 5, wherein the identifying means comprises:
   means for determining whether a predetermined flag is present in at least one of the channels; and
   means for identifying a given channel as either a data channel or a voice channel according to whether the predetermined flag is determined to be present in the given channel.

8. An apparatus as recited in claim 7, wherein the predetermined flag comprises an HDLC idle flag.

9. An apparatus as recited in claim 5, wherein the integration means comprises means for time-division multiplexing the voice data and the non-voice data.

10. An apparatus for transmitting voice data and non-voice data over a T1/E1 line on a network, the T1/E1 line having a plurality of DS0s, the apparatus comprising:
    means for inputting the voice data;
    means for inputting the non-voice data;
    means for automatically configuring the apparatus for operation in the network in response to activation of the apparatus, including means for automatically identifying an allocation of the DS0s between voice data and non-voice data by identifying occurrences of a predetermined flag in the plurality of DS0s, the predetermined flag having been transmitted on the T1/E1 line from a remote source on the network, the allocation having been previously dictated at a remote site;
    means for time-division multiplexing the voice data and the non-voice data; and
    means for transmitting the time-division multiplexed voice data and non-voice data onto the T1/E1 line in accordance with the allocation.

11. An apparatus as recited in claim 10, wherein the means for identifying the allocation of the DS0s between voice data and non-voice data comprises:
    means for determining whether an HDLC idle flag is present in each of the DS0s; and
    means for identifying a given DS0 as a data DS0 if the given DS0 is determined to contain an HDLC idle flag; and
    means for identifying the given DS0 as a voice DS0 if the given DS0 is determined not to contain an HDLC idle flag.

12. An apparatus for transmitting voice data and non-voice data over a frame relay network using a T1/E1 line, the T1/E1 line having a plurality of DS0s, each DS0 representing a different one of a plurality of time slots in each of a plurality of frames, the apparatus comprising:
    means for automatically configuring the apparatus for operation in the network, including
       means for identifying a framing format to be used for transmission of the voice data and the non-voice data over the T1/E1 line;
       means for identifying which of the DS0s are allocated for voice data and which of the DS0s are allocated for non-voice data by observing occurrences of a predetermined flag in the plurality of DS0s;
       means for establishing a virtual circuit between the apparatus and a switch in the network, the switch for conveying the voice data and the non-voice data;
       means for automatically requesting and receiving a network address for the apparatus from a remote device on the network; and
       means for automatically downloading a configuration file into the storage means from the remote device on the network, the configuration file including data for configuring the apparatus;
    storage means for storing data;
    means for inputting the voice data;
    means for inputting the non-voice data;
    means for time-division multiplexing the voice data and the non-voice data; and
    means for transmitting the time-division multiplexed voice data and non-voice data onto the T1/E1 line based on the identified Allocation of DS0s.

13. An apparatus as recited in claim 12, wherein the means for identifying which of the DS0s are allocated for voice data and which of the DS0s are allocated for non-voice data comprises:
    means for determining whether an HDLC idle flag is present in one or more of the DS0s;
    means for identifying a given DS0 as a data DS0 if the given DS0 is determined to contain the idle flag; and
    means for identifying the given DS0 as a voice DS0 if the given DS0 is determined not to contain the idle flag.

14. An apparatus as recited in claim 12, wherein said automatically configuring the apparatus for operation in the network is done automatically in response to activation of the apparatus.

15. A method of operating a device for transmitting voice data and non-voice data over a T1/E1 line, the T1/1 line having a plurality of DS0s, the method comprising:
    in response to activation of the device, automatically configuring the device for operation, wherein said automatically configuring the device for operation includes automatically identifying the allocation of the DS0s between voice data and non-voice data;
    inputting the voice data into the device;
    inputting the non-voice data into the device;
    integrating the voice data an the non-voice data; and
    transmitting the integrated voice data and non-voice data from the device onto the T1/E1 line in accordance with the identified allocation of the DS0s.

16. A method as recited in claim 15, wherein said allocation of the DS0 has been previously defined at a remote site on the network.

17. A method as recited in claim 15, wherein said identifying the allocation of the DS0s comprises identifying the allocation of the DS0s based on a framing characteristic of the frames.

18. A method as recited in claim 15, wherein said identifying comprises:
   determining whether a predetermined flag is present in at least one of the DS0s; and
   identifying each DS0 as either a data DS0 or a voice DS0 according to which of the DS0s has the predetermined flag.

19. A method as recited in claim 18, wherein the predetermined flag is an HDLC idle flag.

20. A method as recited in claim 15, wherein the data DS0s are associated with HDLC frames, and wherein said identifying the allocation of the DS0s comprises identifying the allocation of the DS0s between voice data and non-voice data by observing HDLC idle flags.

21. A method as recited in claim 15, wherein said integrating comprises time-division multiplexing the voice data and the non-voice data.

22. A method of configuring an integration device for integrating voice data non-voice data for transmission of said voice and non-voice data over a T1/E1 line on a network, the T1/E1 line having a plurality of DS0s, each DS0 representing a different one of a plurality of time slots in each of a plurality of frames, the method comprising:
   the integration device identifying a framing format to be used for transmission of the voice data and the non-voice data over the T1/E1 line;
   the integration device identifying the allocation of the DS0s between voice data and non-voice data by observing one or more occurrences of a predetermined flag in the plurality of DS0s, the allocation having been previously defined at a remote site;
   the integration device establishing a virtual circuit to a remote device on the network;
   the integration device requesting and receiving an IP network address for the integration device from the remote device; and
   the integration device requesting and receiving from a remote device a configuration file containing data for configuring the integration device.

23. A method as recited in claim 22, wherein said identifying the allocation of the DS0s comprises:
   the integration device determining whether the predetermined flag is present in at least one of the DS0s; and
   the integration device identifying said allocation based on which of the DS0s includes the idle flag.

24. A method as recited in claim 23, wherein said identifying said allocation based on which of the DS0s includes the idle flag comprises identifying a DS0 as a data DS0 if the given DS0 is determined to contain the idle flag.

25. A method as recited in claim 24, wherein the predetermined flag is an HDLC idle flag transmitted onto the T1/E1 line by a remote source.

26. A method as recited in claim 22, wherein said method is performed automatically in response to activation of the integration device.

* * * * *

UNITED STATES PATENT AND TRADEMARK OFFICE
CERTIFICATE OF CORRECTION

PATENT NO. : 6,654,388 B1
DATED : November 25, 2003
INVENTOR(S) : Luxenberg et al.

It is certified that error appears in the above-identified patent and that said Letters Patent is hereby corrected as shown below:

<u>Title page,</u>
Item [12] and [75], Inventors, replace "Lexenberg" with -- Luxenberg --.

Signed and Sealed this

Twenty-third Day of March, 2004

JON W. DUDAS
*Acting Director of the United States Patent and Trademark Office*